Patented May 28, 1929.

1,714,667

UNITED STATES PATENT OFFICE.

HENRY HARRIS, OF LONDON, ENGLAND.

TREATMENT OF SOLUTIONS CONTAINING TIN AND ARSENIC FOR PRECIPITATION OF TIN.

No Drawing. Application filed September 9, 1925, Serial No. 55,347, and in Great Britain September 18, 1924.

This invention relates to the treatment of solutions containing tin and arsenic for precipitation of tin, and it is especially useful in connection with the recovery of tin from caustic soda solutions derived from the purification of lead by means of caustic soda preferably in admixture with sodium chloride; but the invention is not to be limited to the recovery of tin from solutions thus derived.

In such purification processes as for example by circulating the impure lead in a molten state through a molten reagent of caustic soda and salt, as set forth in some of my prior applications, see for example my copending application Serial No. 724,899, filed on July 8, 1924, considerable quantities of any or all of the metals tin, arsenic and antimony can be removed from the lead in the form of oxysalts. In the recovery of these metals from the spent reagent I discovered, as set forth and claimed in my copending application Serial No. 676,261, filed November 22, 1923, that a suitable calcareous material such as calcium carbonate will precipitate tin from its oxysalt of sodium in the presence of oxysalt of arsenic whether contained in water or alkali solutions, without at the same time precipitating arsenic from its oxysalt.

I have now found that calcareous matter which in general will precipitate arsenic from solutions of arsenates, will not do so in the presence of carbonic acid or carbonates, due perhaps to the prior affinity of calcium salts for carbonic acid. Calcium hydroxide in particular will not react upon arsenic in the presence of carbonic acid. This means that when carbonic acid or carbonates are present in the solution calcareous matter which would not otherwise be effective in precipitating the tin without precipitating arsenic, can be used to accomplish this purpose. To some extent a similar result can be obtained by the presence of sodium carbonate instead of carbonic acid in the solution before the addition of the calcium hydroxide or salt. While calcium hydroxide is particularly effective for the purpose stated, yet various other calcareous matters may be used such for example as any of the mineral acid salts of calcium or even unslaked powdered calcium oxide.

The present invention therefore in its broad aspect may be regarded as a method of preferential recovery of tin from solutions containing oxysalts of tin and arsenic by the addition of calcareous matter (as for example lime) to such a solution already containing carbonates or carbonic acid. The method is of course particularly applicable to solutions containing tin in large quantities in the presence of arsenic and caustic soda.

The following is given by way of illustration, as one example of how the invention may be carried out:—The solution containing dissolved oxysalts of tin and arsenic, usually with some caustic soda, has mixed into it a suitable proportion of sodium carbonate, whereupon the appropriate amount of calcium hydroxide is stirred into the solution which may be either hot or cool, but preferably at a temperature of about 80° C.

If for example the solution containing sodium oxysalts of tin and arsenic is found to contain 50 grams of tin per litre of solution and is free of carbonates, then the quantity of sodium carbonate to be added per litre of solution will be that quantity which contains 26.5 grams or thereabouts of carbon dioxide, which is equivalent to 63.8 grams of pure anhydrous sodium carbonate. If on the other hand the solution of oxysalts already contains carbonate, then the amount of sodium carbonate to be added will be reduced by the quantity which is equivalent to the carbon dioxide already contained per litre of the solution, so as to render the total carbonate present before the addition of lime equal to an equivalent of 26.5 grams of carbon dioxide per litre.

The quantity of pure lime necessary for such a solution containing 50 grams of tin per litre, will be that which will give about 34 grams per litre of solution, equivalent to about 35 grams of commercial lime containing 97 per cent of CaO, which will, however, vary somewhat with the precipitating temperature employed. This should be added preferably in its freshly slacked state and vigorously stirred into the solution for a period depending upon the quantity of solution being treated.

The precipitate which is produced will contain approximately 38 per cent of combined tin and will contain substantially all of the tin which was originally in the solution but very little arsenic, and this precipitate may be separated from the solution which then contains practically the whole of the arsenic and only a proportion of the added carbon dioxide.

Where in the appended claims I use the term "a suitable $CO_2$ compound" I wish to be understood thereby as designating carbonic acid or a carbonate.

While I have described my invention according to the preferred manner of practicing the same and as carried out with certain preferred reagents, it will be obvious to those skilled in the art, after understanding my invention that modifications may be made in the process without departing from the spirit or scope of the invention, and I wish to be understood in the appended claims as covering all such modifications.

Having thus described my invention, what I claim as new and desire to secure by Letters Patent, is:

1. Method of preferential recovery of tin from a solution containing tin and arsenic, which consists in adding calcareous matter as the precipitating agent for the tin, to such a solution already containing a suitable $CO_2$ compound to prevent the simultaneous precipitation of arsenic.

2. Method of preferential recovery of tin from a solution containing sodium oxysalts of tin and arsenic in solution, which consists in adding calcareous matter as the precipitating agent for the tin, to such a solution already containing a suitable $CO_2$ compound to prevent the simultaneous precipitation of arsenic.

3. Method of preferential recovery of tin from a solution containing tin and arsenic, which consists in adding to such a solution, already containing a suitable $CO_2$ compound, as a precipitant for the tin, calcareous matter which would also precipitate the arsenic except for the presence of a said suitable $CO_2$ compound.

4. Method as claimed in claim 1 in which the precipitant is calcium hydroxide.

5. Method of preferential recovery of tin from a solution containing tin and arsenic, which consists in adding as the precipitant for the tin, calcium hydroxide to such a solution already containing sodium carbonate.

6. Method of preferential recovery of tin from a solution containing sodium oxysalts of tin and arsenic in solution, which consists in adding as the precipitant for the tin, calcium hydroxide to such a solution already containing a suitable $CO_2$ compound for preventing the simultaneous precipitation of the arsenic.

In testimony whereof I have signed my name to this specification.

HENRY HARRIS.